US009042935B2

(12) United States Patent
Garnett et al.

(10) Patent No.: US 9,042,935 B2
(45) Date of Patent: May 26, 2015

(54) RADIO CHANNEL COMMUNICATION

(71) Applicant: Microsoft Corporation, Redmond, WA (US)

(72) Inventors: Paul W. Garnett, Albany, NY (US); Trenholme J. Griffin, Bainbridge Island, WA (US); Amer A. Hassan, Kirkland, WA (US); Paul W. A. Mitchell, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/923,905

(22) Filed: Jun. 21, 2013

(65) Prior Publication Data

US 2014/0378127 A1    Dec. 25, 2014

(51) Int. Cl.
| H04B 7/00 | (2006.01) |
| H04W 28/02 | (2009.01) |
| H04W 52/14 | (2009.01) |
| H04W 64/00 | (2009.01) |
| H04W 72/02 | (2009.01) |
| H04W 48/20 | (2009.01) |
| H04W 52/28 | (2009.01) |

(52) U.S. Cl.
CPC ........ *H04W 28/0215* (2013.01); *H04W 52/146* (2013.01); *H04W 64/00* (2013.01); *H04W 72/02* (2013.01); *H04W 48/20* (2013.01); *H04W 52/283* (2013.01)

(58) Field of Classification Search
CPC ..... H04W 52/24; H04W 88/06; H04W 64/00; H04B 1/406
USPC .......................... 455/522, 426.1, 456.6, 552.1
See application file for complete search history.

(56) References Cited

U.S. PATENT DOCUMENTS

| 5,898,670 | A | 4/1999 | Hoebeke et al. |
| 2001/0055289 | A1 | 12/2001 | Kono |
| 2004/0166852 | A1 | 8/2004 | Backers et al. |
| 2008/0259859 | A1 | 10/2008 | Cordeiro et al. |
| 2009/0073922 | A1 | 3/2009 | Malladi et al. |
| 2011/0281535 | A1* | 11/2011 | Low et al. ...................... 455/129 |
| 2012/0189303 | A1 | 7/2012 | Winzer et al. |
| 2012/0224484 | A1 | 9/2012 | Babiarz et al. |

(Continued)

FOREIGN PATENT DOCUMENTS

GB    2448194 A    10/2008

OTHER PUBLICATIONS

Ghosh, et al., "Coexistence Challenges for Heterogeneous Cognitive Wireless Networks in TV White Spaces", Retrieved at <<http://www.ee.washington.edu/research/funlab/Publications/2011Coexistence_in_Wireless_Cognitive_Heterogeneous_Networks_05_19_sroy.pdf>>, In the Proceeding of IEEE Wireless Communications, Aug. 2011, pp. 13.
Kessler, Sarah, "Android Users Get Location-Based Talk Radio App", Retrieved at <<http://mashable.com/2011/04/20/broadcastr-android-app/>>, Apr. 20, 2011, pp. 6.

(Continued)

*Primary Examiner* — Danh Le
(74) *Attorney, Agent, or Firm* — Ladislav Kusnyer; Judy Yee; Micky Minhas

(57) ABSTRACT

The concepts relate to radio channel utilization. One example can monitor a location of a mobile device that has both a first type of wireless capabilities and a second type of wireless capabilities. The example can determine a distance from the location of the mobile device to a location of a wireless device. The example can cause data to be transmitted from the mobile device to the wireless device at a power level based upon the distance.

9 Claims, 6 Drawing Sheets

(56) References Cited

U.S. PATENT DOCUMENTS

| | | | |
|---|---|---|---|
| 2012/0278378 A1* | 11/2012 | Lehane et al. | 709/201 |
| 2013/0029685 A1 | 1/2013 | Moshfeghi | |
| 2013/0069768 A1* | 3/2013 | Madhyastha et al. | 340/12.5 |
| 2013/0113993 A1* | 5/2013 | Dagit, III | 348/552 |
| 2013/0237254 A1* | 9/2013 | Papakipos et al. | 455/456.3 |
| 2013/0244686 A1* | 9/2013 | Saha et al. | 455/456.1 |
| 2014/0066054 A1* | 3/2014 | Jung et al. | 455/426.1 |

OTHER PUBLICATIONS

"A Demonstration of 'White Space' Radio", Retrieved at <<http://www.landmobile.co.uk/news/a-demonstration-of-white-space-radio>>, Jun. 20, 2012, pp. 5.

"International Search Report and Written Opinion," from PCT/US2014/043061, Mailed Nov. 11, 2014, 12 pages.

"Applicant Response to the International Search Report and Written Opinion," from PCT/US2014/043061, Filed Dec. 29, 2014, 19 pages.

\* cited by examiner

RADIO CHANNEL COMMUNICATION

BACKGROUND

Ever increasing numbers of wireless devices are being introduced and sold. As such, the radio frequency (RF) spectrum available for these wireless devices to communicate continues to get more and more crowded. More efficient use of the RF spectrum and sharing under-utilized portions of the RF spectrum are important to meet the growing number of wireless devices.

SUMMARY

The described implementations relate to radio channel utilization and more specifically to selecting transmission power levels on radio channels based upon one or more parameters. One implementation is directed to a device, such as a wireless access point (AP). The device can include memory and a processor configured to execute instructions stored on the memory. The device can also include wireless circuitry including a receiver and a transmitter configured to establish a network utilizing a radio channel. The device can further include a communication manager configured to select a transmission power level for the radio channel based upon multiple parameters. The multiple parameters can include a distance parameter. The distance parameter relates to distance between the device and a different device utilizing the network. Another parameter can be a network interference parameter relating to a number of devices using the network. The communication manager can be configured to cause the transmitter to transmit on the radio channel at the selected transmission power.

Another example relates to a device, such as a mobile device, that includes memory and a processor configured to execute instructions stored on the memory. The device also includes positional circuitry configured to determine a location of the device. The device further includes a communication manager configured to determine a distance from the device to a second device. The communication manager can be configured to identify a radio channel to communicate with the second device based at least in part on the distance.

The above listed examples are intended to provide a quick reference to aid the reader and are not intended to define the scope of the concepts described herein.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced.

DETAILED DESCRIPTION

Overview

This patent relates to utilizing the radio frequency (RF) spectrum. More specifically the patent relates to utilizing radio frequencies/channels and selecting transmission power levels on radio channels based upon one or more parameters. Traditionally, devices transmitted at an authorized power level or at the highest power level the device could produce. In contrast, the present implementations can select a transmission power level customized to a specific scenario. Thus, rather than transmitting at full power, a device may transmit at a fraction of its full power. The selected transmission power can be based upon parameters relating to the specific scenario.

The present concepts can be applied to any radio channel, such as radio white space channels. (As used herein the terms "radio frequency" and "radio channel" are used interchangeably.) One type of radio white space channel relates to the portion of the radio spectrum reserved for television (TV) broadcasting. As used herein a "TV white space channel" means a channel or channel range that was reserved for TV broadcasting, but which is not actually used for TV broadcasting in a particular geographic region. Similarly, "radio white space channel" means a channel or channel range that was reserved for TV broadcasting, for other radio broadcasting, or two-way radio communications, but which is not actually used in such manner in a particular geographic region. Stated another way, radio white space can refer to allocated but unused portions of the radio spectrum.

System Examples

Figure 1:
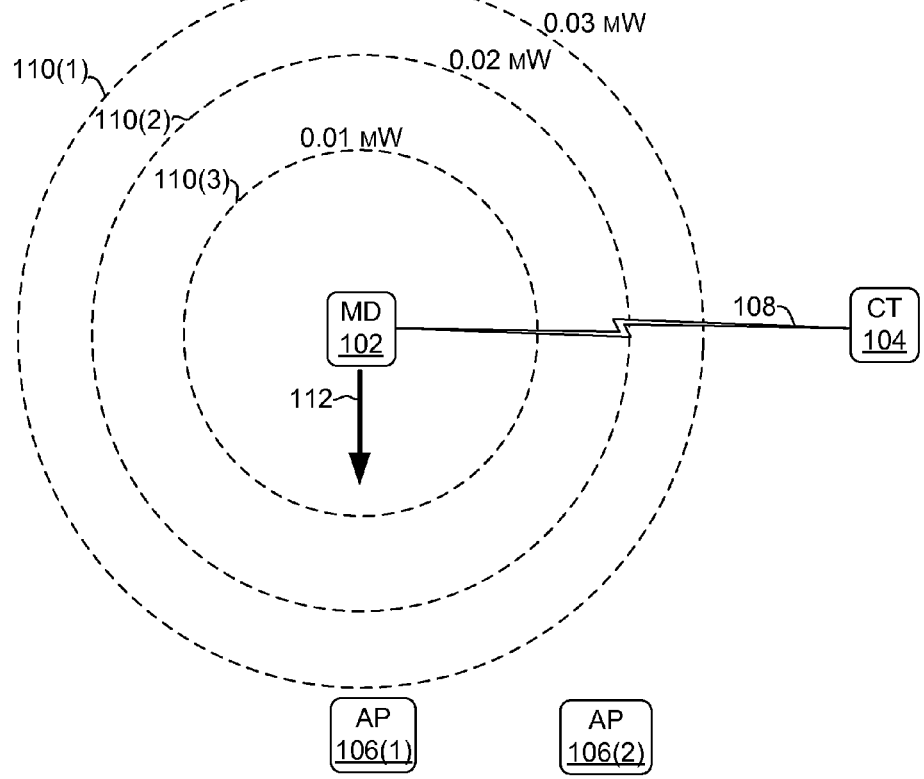
FIGS. 1-4 show examples of systems configured to utilize radio channels in accordance with some implementations of the present concepts.
Figure 1:
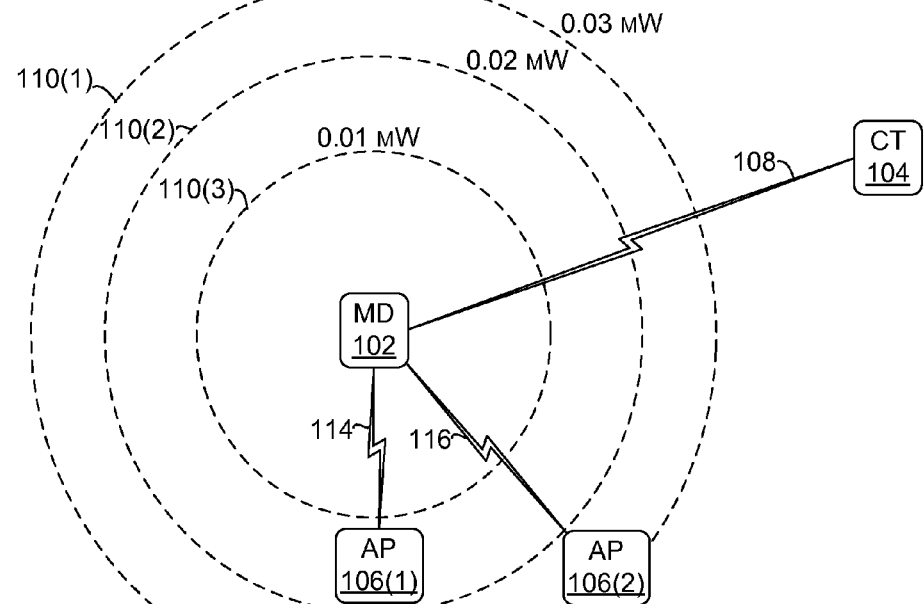

For purposes of explanation consider introductory FIG. 1, which shows a scenario involving a system 100 that includes a mobile device 102, such as a smart phone, tablet type computer, notebook computer, etc. System 100 also includes a cell tower 104 and two wireless access points (APs) 106(1) and 106(2). Of course, the number of wireless devices, cell towers, and/or APs is illustrative and not intended to be limiting.

The mobile device 102 can have multiple types of wireless capabilities. For instance, a first type of wireless capability can be cellular capabilities. In this case, assume that the mobile device 102 can communicate with the cell tower 104 utilizing a first set of radio channels as indicated by 'lightning bolt' 108. Assume further that the second type of wireless capability utilizes another set of non-cellular radio channels. For instance, the second type of wireless capability can utilize a Wi-Fi compliant capability (such as 2.4 Gigahertz (GHz) or 5.0 GHz channels), among others. The mobile device can communicate over Wi-Fi networks by transmitting and receiving in compliance with Wi-Fi standards. Assume further that the mobile device has a transmission power limit for Wi-Fi of 0.03 milliWatts (mW) and that this value is less than a transmission power limit imposed by the Wi-Fi standards. Stated another way, the elements of the mobile device are configured to transmit on Wi-Fi channels at 0.03 mW or less. The 0.03 mW value can be less than or equivalent to any power limits defined by the Wi-Fi standards. For instance, the Wi-Fi standards could define a maximum transmission power level of 0.04 mW, for example. (Note that while specific radio spectrum channels, such as Wi-Fi, cellular, TV white spaces, etc., are discussed for purposes of explanation, the present concepts can be applied to any radio spectrum channels.)

With mobile device 102 as the focus, circle 110(1) indicates how far the mobile device can transmit at 0.03 mW. Circle 110(2) shows how far the mobile device can transmit at 0.02 mW and circle 110(3) shows how far the mobile device can transmit at 0.01 mW. The radii of the circles can be determined from previous testing. For instance, the radii can represent average conditions. Alternatively, the radii can reflect specific conditions presently encountered by the mobile device, such as temperature, terrain, precipitation, etc. (Assume in this example that the transmission power of the APs is greater than or equal to the transmission power of the mobile device. For instance, continuing with the above mentioned example, the AP could be configured to transmit at the Wi-Fi defined limit of 0.04 mW whereas the mobile device can only transmit at 0.03 mW or less.)

At Instance 1 the mobile device 102 can communicate with cell tower 104. However, APs 106(1) and 106(2) are outside of the mobile device's transmission range (e.g., outside of circle 110(1)). Thus, the mobile device can accomplish two-way data communication with cell tower 104, but not with APs 106(1) and 106(2). At this point, the mobile device is moving toward AP 106(1) as indicated by arrow 112.

At Instance 2, the mobile device 102 has moved far enough that AP 106(1) is within circle 110(2) and AP 106(2) is within (or on) circle 110(1). At this point, the mobile device can accomplish two-way communication with AP 106(1) as indicated by lightning bolt 114. Similarly, the mobile device can communicate with AP 106(2) as indicated by lightning bolt 116. However, transmission power requirements to communicate with AP 106(1) are less than with AP 106(2) (e.g., 0.02 mW versus 0.03 mW). Thus, at Instance 2, the mobile device can switch some or all of its data communications from cell tower 104 to APs 106(1) and/or 106(2). Various parameters can be considered in the decision whether to use the cell tower or the APs. Examples of these parameters can include battery power of the mobile device (or plugged-in versus operating on battery power), quality of service (QoS) considerations, cost (e.g., data rates for a cell plan associated with the mobile device and the cell tower by a cell service provider), and/or interference on the APs and/or cell network, among others. The mobile device may switch some or all of its data communication from one wireless capability to another. For instance, voice (phone) may be maintained with the cell tower while another application, such as video streaming may be switched to one of the APs. Further, relative to a specific application the mobile device 102 may choose to upload via an AP (such as AP 106(1)), but download via the cell tower 104, for example (or vice-versa).

In summary, the location of the mobile device 102 can be monitored. The distance between the mobile device and various wireless resources (such as cell tower 104, AP 106(1), and/or AP 106(2)) can be determined. A determination can be made as to which wireless capability the mobile device will utilize in a given scenario. For example, in the illustrated configuration of Instance 1, the mobile device does not have enough transmission power to reach either of the APs 106(1) or 106(2). As such, the mobile device communicates with the cell tower 104. At Instance 2, the mobile device can communicate with the cell tower utilizing cell capabilities and/or the APs using non-cell capabilities. In this latter case, various parameters can be utilized to determine which capability to utilize. For instance, if a QoS parameter is generally equivalent for either cell communication with the cell tower or Wi-Fi communication with one of the APs, the mobile device may choose to utilize the capability which utilizes less of the mobile device's battery power. The process can be repeated when parameters change, such as if the mobile device moves, experiences network interference, goes over its allotted cell data plan usage, and/or draws down the battery power, among others.

From another perspective, the present concepts can consider distance (e.g., relative location) and/or other parameters when determining what wireless capabilities/technologies to utilize and/or what transmission power to utilize with an individual wireless technology.

Figure 2:
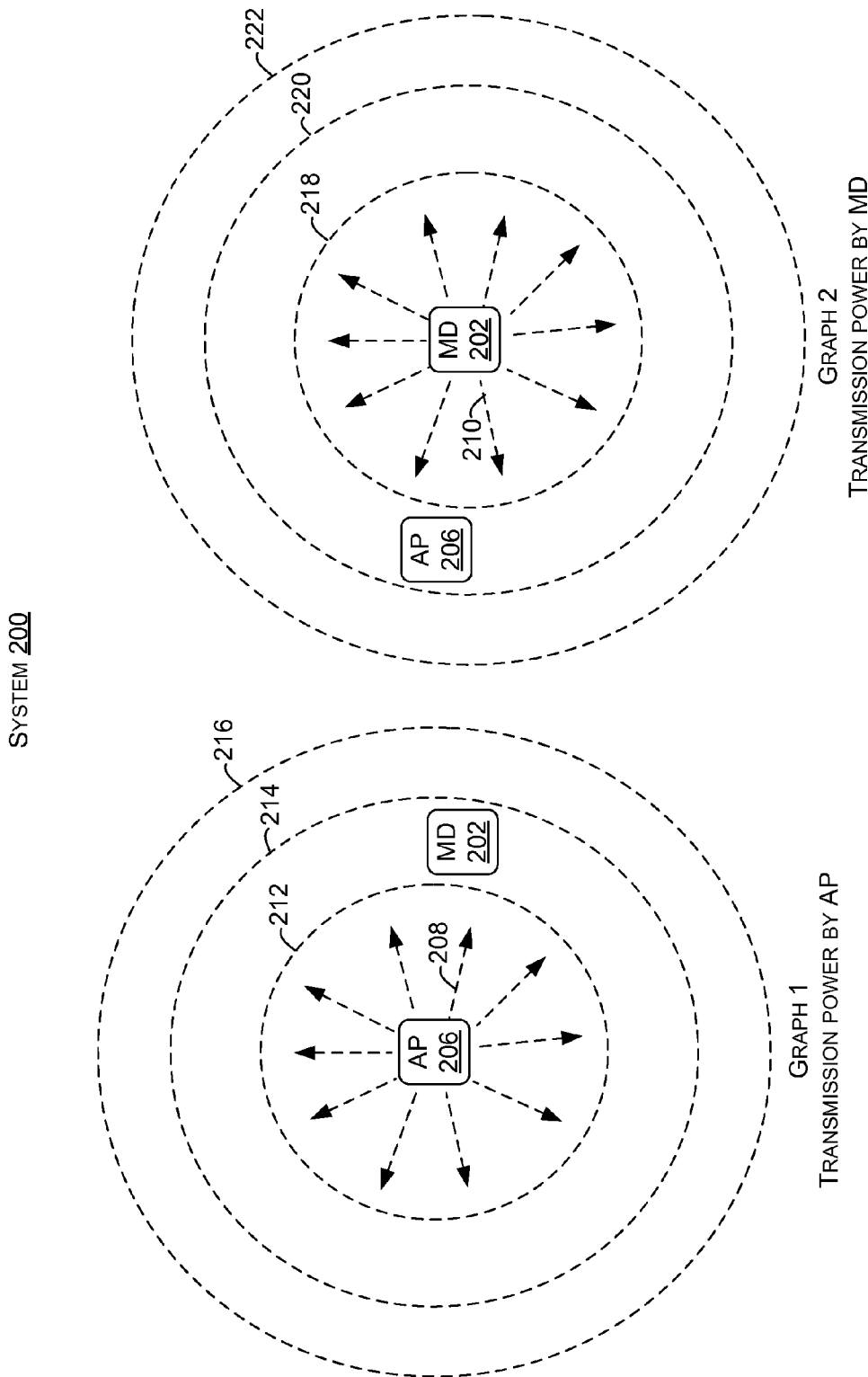

FIG. 2 shows another system 200 that involves distance considerations. The system includes a mobile device 202 and an AP 206. This system can illustrate how a distance parameter can be considered in determining which wireless capability to utilize for data communication in a given scenario. Graph 1 and Graph 2 each show the same relative relationships of the mobile device 202 and the AP 206. Graph 1 relates to transmission power by the AP 206 and is centered on the AP. Graph 2 relates to transmission power by the mobile device 202 and is centered on the mobile device. Assume that AP 206 has established a network on an individual radio channel. For ease of explanation, Graph 1 relates to a single radio channel, such as a radio white space channel. Further assume that Graph 2 relates to the same radio white space channel. However, note that the AP 206 and/or the mobile device 202 may be simultaneously transmitting on multiple different radio channels. Note further, that the channels may or may not be the same. For instance, AP 206 could be transmitting on channel "x". Mobile device 202 could be receiving on channel "x" and transmitting back on channel "y" which is being received on the AP.

Returning to the illustrated configuration, radiating arrows 208 indicate transmission by AP 206 and radiating arrows 210 indicate transmissions by mobile device 202. Relative to Graph 1, transmissions at a first power level can reach inner circle 212 at a sufficient level to be processed by a receiving device, such as mobile device 202. Similarly, transmissions at an intermediate level can reach intermediate circle 214, and transmissions at a higher level can reach outer circle 216. The higher level could be the maximum power level that the AP can generate at the radio channel. Alternatively, the higher level could be the maximum authorized transmission power level for the radio channel. In this case, 'transmissions' refers to a data channel. (In some circumstances, control channels may be successfully received at greater distances than respective data channels at a given transmission power.)

Often, if the AP 206 is plugged into a power source, such as AC power, the AP may transmit at the higher level. However, in some cases, the AP may transmit below the higher level. For instance, the AP may be positioned proximate to an adjacent AP that is transmitting on the same channel. High power transmission by AP 206 may cause interference with the adjacent AP. In the illustrated configuration, transmission by the AP at the intermediate power level (e.g., to intermediate circle 214) is sufficient for MD 202. Thus, AP 206 might transmit at the intermediate power unless it receives an indication that another/second mobile device is between the intermediate and outside circles 214 and 216 and that the second mobile device wants to utilize the network. For instance, AP 206 might receive a probe response from the second mobile device or otherwise be made aware of its presence/location. Responsively, AP 206 could increase its transmission power from the intermediate level to the higher level.

Viewed from another perspective, the AP 206 can multiplex traffic based on various parameters, such as mobile device (e.g., client) location, traffic distribution, and application type (e.g., quality of service (QoS)). (Different types of applications can have different QoS requirements.) In one case, the mobile device 202 can report its location and its radio capabilities. For instance, the mobile device can advertise its supported data rates and channel band using an action frame. The AP 206 can utilize the parameters to determine an appropriate transmission power. The AP may also utilize other parameters (either alone or in combination with the above mentioned parameters) to determine the appropriate transmission power. For instance, the AP may consider the density of mobile devices within Graph 1 when determining the appropriate transmission power.

Another parameter can relate to use of adjacent channels. For instance, in radio white space scenarios, such as TV white spaces, licensed use of an adjacent channel limits transmission levels. For example, assume that the AP is transmitting on TV WS channel 60. In some jurisdictions, if channels 59 or 61 are licensed TV broadcast channels, then the AP is limited to transmitting at 100 mW. In contrast, if the adjacent channels are not licensed, the AP can transmit up to 4 W.

Graph 2 shows the distance of the AP 206 from the perspective of the mobile device 202. In a similar fashion to that explained above relative to Graph 1, Graph 2 includes an inner circle 218, an intermediate circle 220, and an outer circle 222. Transmissions from the mobile device 202 at a first power level can reach inner circle 218 at a sufficient level to be processed by a receiving device such as AP 206. Similarly, transmissions at an intermediate level can reach intermediate circle 220, and transmissions at a higher level can reach outer circle 222. The higher level could be the maximum power level that the mobile device can generate at the radio channel. Alternatively, the higher level could be the maximum authorized transmission power level for the radio channel in a given scenario.

The distance from the mobile device 202 to the AP 206 can be utilized to determine the transmission power level to employ. Thus, in some cases, the mobile device can transmit at the intermediate power level to successfully communicate with the AP. Transmitting at the intermediate power can drain power resources (e.g. the battery) slower than transmitting at higher power levels. As such, knowing the distance to the AP can allow the mobile device to conserve resources while effectively transmitting to the AP. Some implementations can utilize only the distance to decide the transmission power level for the mobile device. Other implementations can include other parameters in the decision making process. For instance, the geography of the distance between the two devices could reduce the effective transmission range. For example, buildings, hills, and/or trees could impede the transmission. Further, precipitation could diminish the effective transmission range. These parameters could be collectively considered to determine the employed transmission power level.

Figure 3:
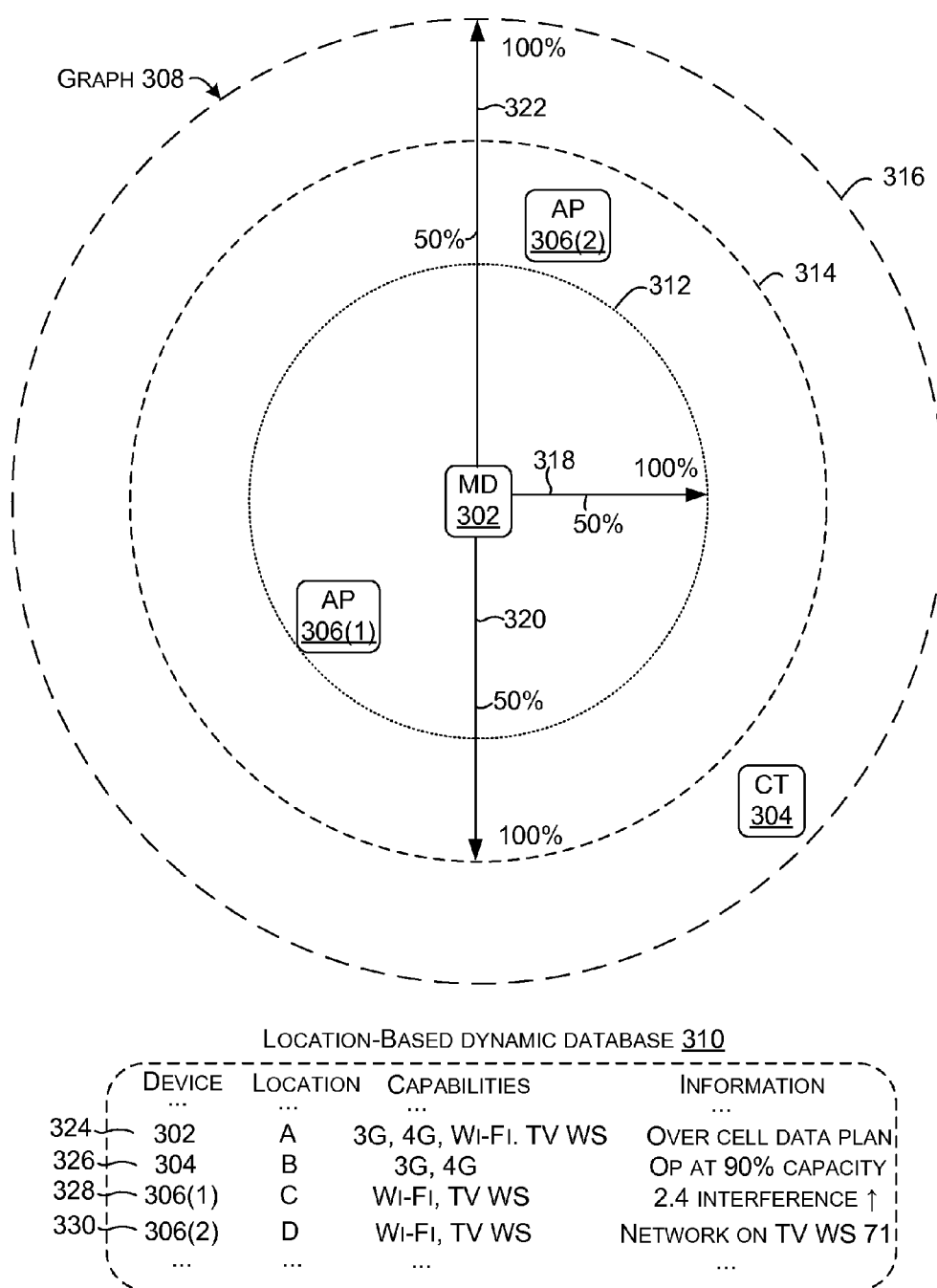

FIG. 3 shows another system 300. System 300 includes a mobile device 302, a cell tower 304, and two APs 306(1) and 306(2) on a graph 308. System 300 represents a mobile device centric view, and thus, the mobile device is centered on the graph 308. System 300 also includes a location-based dynamic database 310 which is discussed in more detail below.

In the illustrated configuration, the mobile device 302 is surrounded by three concentric circles 312, 314, and 316. Each of the circles represents a maximum transmission distance for a specific wireless capability that can be employed by the mobile device.

For purposes of explanation, assume that circle 312 relates to a Wi-Fi capability (e.g., 2.4 GHz), circle 314 relates to a TV white spaces capability, and circle 316 relates to cellular capability. For instance circle 312 can represent the distance (e.g., radius) that the mobile device can transmit when transmitting at 100% of its capacity (such as 0.03 mW). Line 318 can be thought of as another way to represent the radius of transmission relative to the Wi-Fi capability. For example, at 100% of the maximum power level the line reaches circle 312. In this case, the radius of transmission at 50% of the maximum power level is also shown. (Of course, the radii corresponding to other percentages can also be calculated, but are not illustrated for sake of brevity). Line 320 can be thought of as another way to represent the radius of transmission relative to the TV white spaces capability. Line 322 can be thought of as another way to represent the radius of transmission relative to the cell capability.

The location-based dynamic database 310 can relate to wireless devices and can contain entries for mobile device 302 (horizontal row 324), cell tower 304 (horizontal row 326), AP 306(1) (horizontal row 328), and AP 306(2) (horizontal row 330). The location-based dynamic database can include the location, capabilities, and other/additional information for each device (e.g., each row). Row 324 indicates that the mobile device is at hypothetical location "A" (e.g., the center of the graph 308). The mobile device has 3G, 4G, Wi-Fi, and TV WS capabilities. In this example, the additional information indicates that the mobile device is over (e.g., exceeded) its cell data plan. Relative to the cell tower 304, row 326 indicates that the cell tower is at location "B" and the cell tower has 3G and 4G capabilities. The additional information indicates that the cell tower is operating at 90% of capacity.

Row 328 indicates that AP 306(1) is at location "C" and has Wi-Fi and TV White Space capability. The additional information indicates that a 2.4 GHz Wi-Fi network established by the AP is experiencing high ("↑") interference.

Row 330 indicates that AP 306(2) is at location "D" and has Wi-Fi and TV White Space capability. The additional information indicates that the AP has established a network on TV WS channel 71.

The location-based dynamic database 310 could also contain information from the graph 308 and/or information that can be derived from the graph. For instance, the location-based dynamic database 310 could include the distance from location A to location B, the distance from location A to location C, etc. The location-based dynamic database 310 could also include the transmission distance for the mobile device at various channels at various transmission power levels. However, for purposes of explanation the graph 308 and database 310 are shown and described as distinct elements.

For purposes of explanation, assume that mobile device 302 has just arrived at location A. The graph 308 and location-based dynamic database 310 can provide information about what wireless capabilities are available to the mobile device and power levels for using individual wireless capabilities. For instance, circle 312 indicates that the mobile device has enough transmission power to communicate with AP 306(1) via Wi-Fi. Similarly, circle 314 indicates that the mobile device has enough transmission power to communicate with AP 306(1) and AP 306(2) via TV WS. Further, line 320 indicates that the mobile device will have to transmit at close to its maximum transmission power limits to reach AP 306(2) on a TV WS channel. However, the mobile device can transmit at approximately 50% of its transmission power limits to reach AP 306(1). Further still, circle 316 indicates that the mobile device can communicate with cell tower 304 by transmitting at close to its 3G or 4G transmission power limit.

Data communication decisions for the mobile device 302 can be based upon these location-based parameters and further parameter information from the location-based dynamic database 310. For instance, the mobile device is close enough to the cell tower 304 to successfully communicate with the cell tower. However, the mobile device is over its cell data plan (as indicated in row 324). As such, further communication using cellular capabilities is likely to be expensive and/or slow depending on contract terms with the cell service provider. Thus, this is an example of a parameter that can negatively influence a decision to utilize the cell tower for data communication.

The mobile device 302 is close enough to successfully communicate with AP 306(1) using Wi-Fi capabilities. However, circle 312 indicates that the transmission power level will likely be in the 90%-100% range of the mobile device's transmission capabilities to successfully communicate with AP 306(1) on the 2.4 GHz Wi-Fi channel. Further, row 324 of the location-based dynamic database 310 indicates that interference is high on the 2.4 GHz Wi-Fi channel of the network supported by AP 306(1). Accordingly, a decision may be made to utilize TV WS channel 71 to communicate with AP 306(2) as indicated at row 330. As such, the mobile device may send a probe response to AP 306(2) on TV WS channel 71. Once communication is established, the mobile device may utilize this wireless capability as its default wireless capability until a parameter change is detected. The mobile device can also send any new information to the location-based dynamic database 310 for inclusion therein (thus, contributing to the dynamic nature of the database).

The location-based dynamic database 310 can of course include additional and/or different information than the illustrated example. For instance, in some cases, allowed transmission power levels can be tiered based upon other factors. In one such example, transmission on TV white space channels is limited to a first (relatively low) value when the channel is adjacent to a licensed broadcast TV channel. For example, in an area where a television signal is broadcast on channel 72, then transmission on TV whitespace channel 71 is limited to the first lower value. In contrast, if the broadcast channels in that area are 69 and 73, then transmission levels for TV whitespace channel 71 are allowed to be a second (relatively higher) value. This information can be used to determine what channels the mobile device may want to use and what power level to transmit on those channels (within the capabilities of the device). The concepts described relative to mobile device 302 in FIG. 3 can be applied to other devices, such as APs.

Figure 4:
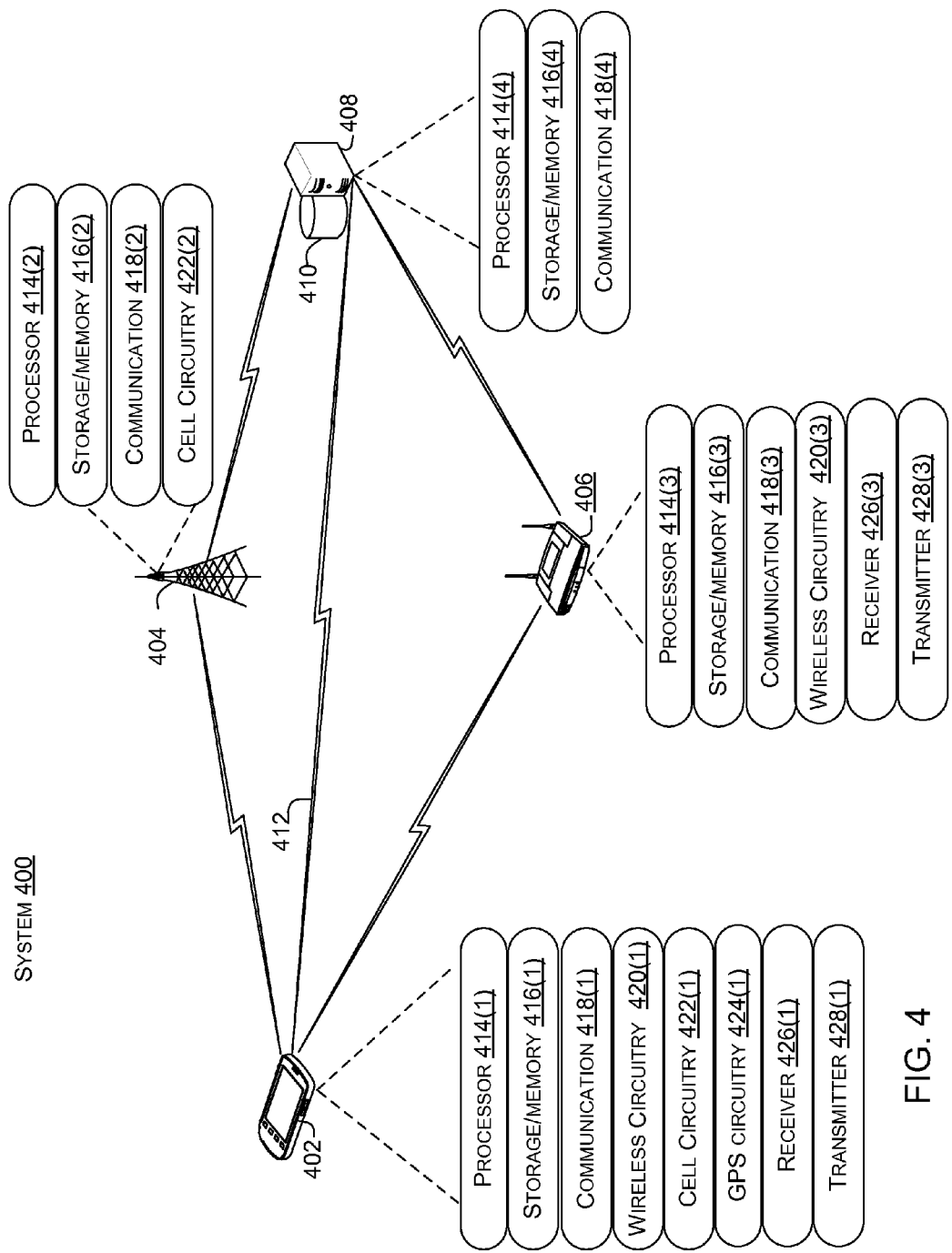

FIG. 4 shows a system 400 that can enable the transmission power concepts described above. Further, system 400 can include multiple devices. In the illustrated configuration, a first device is a mobile device 402 that can be similar to mobile devices 102, 202, and/or 302 that are described above. The next device is a cell tower 404 that can be similar to cell towers 104 and 304 described above. The third device is an AP 406 that can be similar to APs 106(1), 106(2), 206, 306(1), and 306(2) described above. In this case, the AP 406 is manifest as a wireless router. The fourth device is a computer 408, such as a server computer that may be manifest at a defined location or as cloud-based resources. Further, a location-based dynamic database 410 can be accessed by the devices 402-408. In the illustrated configuration, the location-based dynamic database 410 is shown with computer 408. In other implementations, the location-based dynamic database can be independent of, but accessible to, individual devices. Further, the location-based dynamic database or a subset thereof (e.g., local copy) may be resident on an individual device, such as mobile device 402. The above mentioned devices can communicate via one or more networks, as represented by lightning bolts 412.

The devices 402-408 can include a processor 414, storage/memory 416, a communication manager or component 418, wireless circuitry 420, cell circuitry 422, global positioning system (GPS) circuitry 424, a receiver 426, and/or a transmitter 428. Not all of these elements need occur on each device. Individual devices can alternatively or additionally include other elements, such as input/output devices (e.g., touch, voice, and/or gesture), buses, graphics cards, etc., which are not illustrated or discussed here for sake of brevity.

For ease of explanation, in this discussion the use of a designator with the suffix, such as "(1)", is intended to refer to a specific element instance on a specific device. In contrast, use of the designator without a suffix is intended to be generic. Thus, a discussion of processor 414 is intended to be generic to all of the devices, whereas a discussion of processor 414(1) is intended to be specific to mobile device 402. Of course, not all device implementations can be illustrated and other device implementations should be apparent to the skilled artisan from the description above and below.

The term "device", "computer", or "computing device" as used herein can mean any type of device that has some amount of processing capability and/or storage capability. Processing capability can be provided by one or more processors (such as processor 414) that can execute data in the form of computer-readable instructions to provide a functionality. Data, such as computer-readable instructions, can be stored on storage, such as storage/memory 416 that can be internal or external to the computer. The storage can include any one or more of volatile or non-volatile memory, hard drives, flash storage devices, and/or optical storage devices (e.g., CDs, DVDs, etc.), among others. As used herein, the term "computer-readable media" can include signals. In contrast, the term "computer-readable storage media" excludes signals. Computer-readable storage medium/media includes "computer-readable storage devices." Examples of computer-readable storage devices include volatile storage media, such as RAM, and non-volatile storage media, such as hard drives, optical discs, and flash memory, among others.

Examples of devices can include traditional computing devices, such as servers, personal computers, desktop computers, notebook computers, cell phones, smart phones, personal digital assistants, pad type computers, mobile devices, wireless devices, cameras, routers, or any of a myriad of ever-evolving or yet to be developed types of computing devices. A mobile computer or mobile device can be any type of computing device that is readily transported by a user and may have a self-contained power source (e.g., battery). Similarly, a wireless device can be any type of computing device that has some capability to communicate with other devices without being physically connected to them. In some cases, a wireless device may have both wireless and wired capabilities. For instance, a router can be physically connected to a network, such as with an Ethernet cable, and wirelessly communicate with devices over radio channels, such as radio white space channels and/or Wi-Fi channels, among others.

In the illustrated implementation, devices 402-408 are configured with a general purpose processor 414 and storage/memory 416. In some configurations, a device can include a system on a chip (SOC) type design. In such a case, functionality provided by the device can be integrated on a single SOC or multiple coupled SOCs. One or more processors can be configured to coordinate with shared resources, such as memory, storage, etc., and/or one or more dedicated resources, such as hardware blocks configured to perform certain specific functionality. Thus, the term "processor" as used herein can also refer to central processing units (CPUs), graphical processing units (CPUs), controllers, microcontrollers, processor cores, or other types of processing devices suitable for implementation both in conventional computing architectures as well as SOC designs.

The communication manager 418 is described in more detail below after the other elements are described. Briefly, the communication manager 418 can be configured to determine a location of a device, such as mobile device 402. The communication manager can utilize positional circuitry, such as GPS circuitry 424 to determine the location. The communication manager can also be configured to determine a distance from the device to another/second device, such as AP 406. The communication manager can then identify a radio channel for the mobile device to communicate with the second device. The communication manager can utilize the distance (solely or in combination with other parameters) to select a transmission power level for the device to communicate with the second device on the radio channel.

Wireless circuitry 420 can facilitate communication over various radio channels, such as radio white space channels, Wi-Fi channels, Bluetooth channels, etc. The cell circuitry 422 can be thought of as a subset of the wireless circuitry relating to cellular channels. The cellular circuitry can handle communications over cell data channels and cell control channels. The GPS circuitry 424 can utilize GPS satellite signals to calculate the device's location.

The receiver 426 and the transmitter 428 can function to transmit and receive data at various channels. For example, the receiver 426 and the transmitter 428 can be configured to operate at specific channels, such as 2.4 Giga Hertz channel, 5.0 Giga Hertz channel, 60 Giga Hertz channel, radio channels, and/or TV channels (50 Mega Hertz to 810 Mega Hertz), among others. Alternatively, the transmitters and receivers can be configured to tune to any channels in the RF spectrum. Transmitter 428 can be configured to transmit at a specific power or a range of powers. For instance, the transmitter can be configured to transmit at 0.01 mW or a range of powers from 0 to 0.01 mW. The transmitter can have different power limits for different channels. For instance, a Wi-Fi transmission power limit may be lower than a TV WS power limit.

While discrete components or elements are illustrated, some implementations may combine elements. For instance, wireless circuitry 420 may include dedicated receivers and transmitters rather than interfacing with distinct receivers and transmitters 426 and 428, respectively. The wireless circuitry 420, cell circuitry 422, GPS circuitry 424, receiver 426, and/or the transmitter 428 can be hardware based or a combination of hardware and software. The circuitry may utilize a system on a chip (SOC) configuration (described above).

The following example relates to a mobile device-centric implementation. A server-centric implementation is described below, followed by an AP-centric implementation. In this case, the communication manager 418(1) can obtain location information from GPS circuitry 424(1). The communication manager can access location-based dynamic database 410 and/or can maintain the location-based dynamic database on the device. The location-based dynamic database can include the locations of other devices. The communication manager 418(1) can identify other devices, such as cell tower 404 and/or AP 406 that are relatively close to mobile device 402. The communication manager 418(1) can utilize this distance information and other information from the location-based dynamic database to select devices to communicate with and on which channels. A non-exhaustive list of other parameters that can be considered in selecting the device can include network conditions, cost, and/or QoS, among others.

The communication manager 418(1) can cause the receiver 426(1) and the transmitter 428(1) to tune to the selected channels. The communication manager 418(1) can determine the transmission power level for the transmitter 428(1) based upon information from the location-based dynamic database 410 and information from mobile device 402, such as battery status, interference, etc. The communication manager 418(1) can update the location-based dynamic database to reflect the selected channel, the transmission power level, and/or other useful information (e.g., sensed network conditions, networks utilized, etc.).

This example is a server-centric implementation that can be implemented by computer 408, among others. In this case, communication manager 418(4) can monitor locations of mobile devices within a given region, such as a service area. The computer 408 can request location information from the mobile device's GPS circuitry 424(1) via communication manager 418(1). Alternatively or additionally, the communication manager 418(4) can cause triangulation (such as cell tower triangulation or Wi-Fi access point triangulation) to be performed to determine the mobile device's location.

Of course, while a single device is illustrated for sake of brevity, the region or service area may include thousands or millions of mobile devices. The communication manager 418(4) can update the location changes in the location-based dynamic database 410. The location-based dynamic database 410 can also include the locations of 'fixed' devices, such as cell tower 404 and/or AP 406. The communication manager 418(4) can track information about networks supported by the cell tower 404 and/or AP 406. The communication manager 418(4) can utilize the location-based dynamic database to determine distances between the mobile device and the fixed devices. The communication manager 418(4) can utilize the distances and other information from the location-based dynamic database 410 to determine which devices for the mobile device to communicate with, on what channels, and/or at what transmission power levels.

In some cases, the cell tower 404 and/or the AP 406 may belong to and/or be associated with a service provider that also maintains the location-based dynamic database 410. The mobile device 402 may have a relationship, such as a service contract, with the service provider. The service provider can suggest channels and power levels to the mobile device 402. The suggestions can allow the service provider to 'shift' past communication from crowded networks to less crowded networks while considering battery use, cost, and/or QoS from the mobile device's perspective. For instance, the service provider could send a message to the mobile device on a cellular control channel to switch some or all of its communication from the network provided by the cell tower 404 to a network provided by the AP 406. The message can also indicate a suggested transmission power level for the mobile device to communicate on the network. In another case, the mobile device may be communicating with the AP 406 on a network, such as a TV white spaces network. The service provider can cause the AP 406 to send an instruction to the mobile device that indicates a transmission power level for the mobile device. For example, the instruction could be contained in an action frame or a beacon frame. In some cases, the service provider may perform a similar functionality relative to AP 406. In that case, the service provider may instruct the AP to form networks on the specific channels and to transmit on those channels at specific power levels based upon the parameters.

In the AP-centric example, the AP 406 can determine what power level to transmit on specific radio channels. For instance, communication manager 418(3) can be configured to identify available radio channels upon which the AP can establish a network. The communication manager 418(3) can select transmission power levels for individual radio channels based upon multiple parameters. The parameters can relate to a distance parameter between the AP and mobile devices utilizing individual networks (e.g., individual radio channels). Other parameters can relate to network interference. Network interference can relate to a number of the mobile devices using the network. Network interference can also relate to the distribution of the mobile devices (e.g., high densities of mobile devices in close proximity to one another can accentuate interference issues). The communication manager 418(3) can compute the distances utilizing triangulation. Alternatively, the communication manager 418(3) can obtain locations from the mobile devices and calculate the distances. Alternatively, the communication manager 418(3) can obtain the distances (and other parameters) from location-based dynamic database 410.

The communication manager 418(3) can select a transmission power based upon the parameters. The communication manager 418(3) can then cause the transmitter 428(3) to transmit on the radio channel at the selected transmission power. Of course, while a single network on a single radio channel is described for ease of explanation, the communication manager 418(3) may be simultaneously handling multiple channels and/or multiple transmission power levels.

In some configurations, the communication manager 418 can be installed as hardware, firmware, and/or software during manufacture of the device 402-408 or by an intermediary that prepares the device for sale to the end user. In other instances, the end user may install the communication manager, such as in the form of a downloadable application.

Note that some implementations can utilize information about a device, such as location information. Any such information gathering can be conducted in a manner that protects the security and privacy of the user. The user can be given notice of the use and allowed to opt-in, opt-out, and/or define such use. In any event, the present implementations can be accomplished in a manner that utilizes the information in a very targeted way that limits the use of the information to accomplishing the present radio network utilization concepts.

Method Examples

Figure 5:
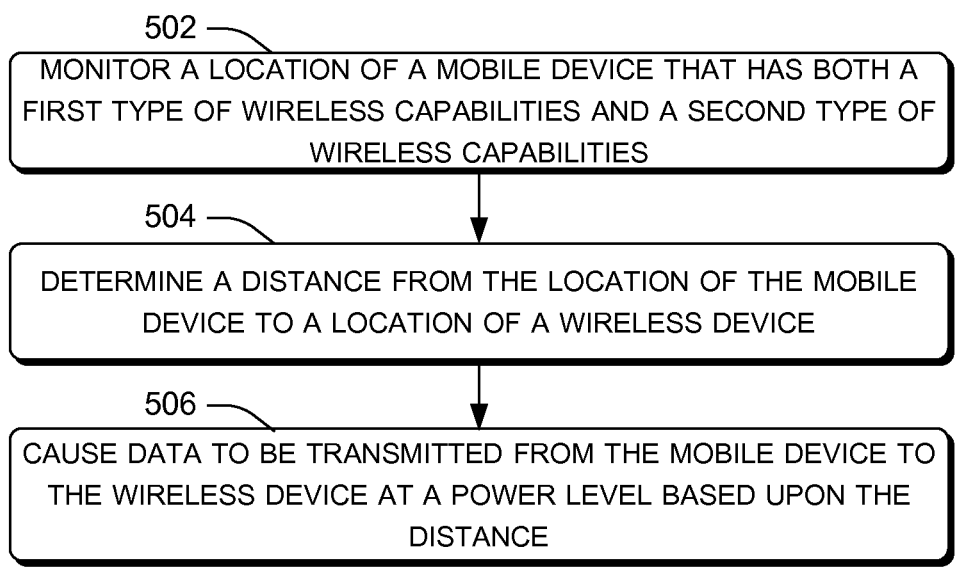
FIGS. 5-6 are flowcharts of examples of radio channel utilization techniques in accordance with some implementations of the present concepts.

FIG. 5 shows a method 500 for utilization of radio channel communications.

The method can monitor a location of a mobile device that has both a first type of wireless capabilities and a second type of wireless capabilities at 502. In some cases, the monitoring can be accomplished by obtaining GPS coordinates of the mobile device. In other cases, monitoring can be accomplished by triangulating the location relative to known locations of other devices.

The method can determine a distance from the location of the mobile device to a location of a wireless device at 504. The method can determine the distance by calculating the distance from the two locations. Alternatively, the method can look up the distance in a database, such as the location-based dynamic database. The method can also include selecting a radio channel for the data to be transmitted based at least in part upon the distance. In some cases, the method can be performed by a cellular service provider associated with the mobile device. In other cases, the method can be performed by the mobile device. In still other cases, the method can be performed by another entity that is not a service provider or the mobile device. Further, an AP can perform the method or a similar method that relates to the AP rather than the mobile device.

The method can cause data to be transmitted from the mobile device to the wireless device at a power level based upon the distance at 506. The power level can be adjusted based upon changing conditions, such as changes in interference levels and/or a location change of the mobile device (e.g., movement), among others.

Figure 6:
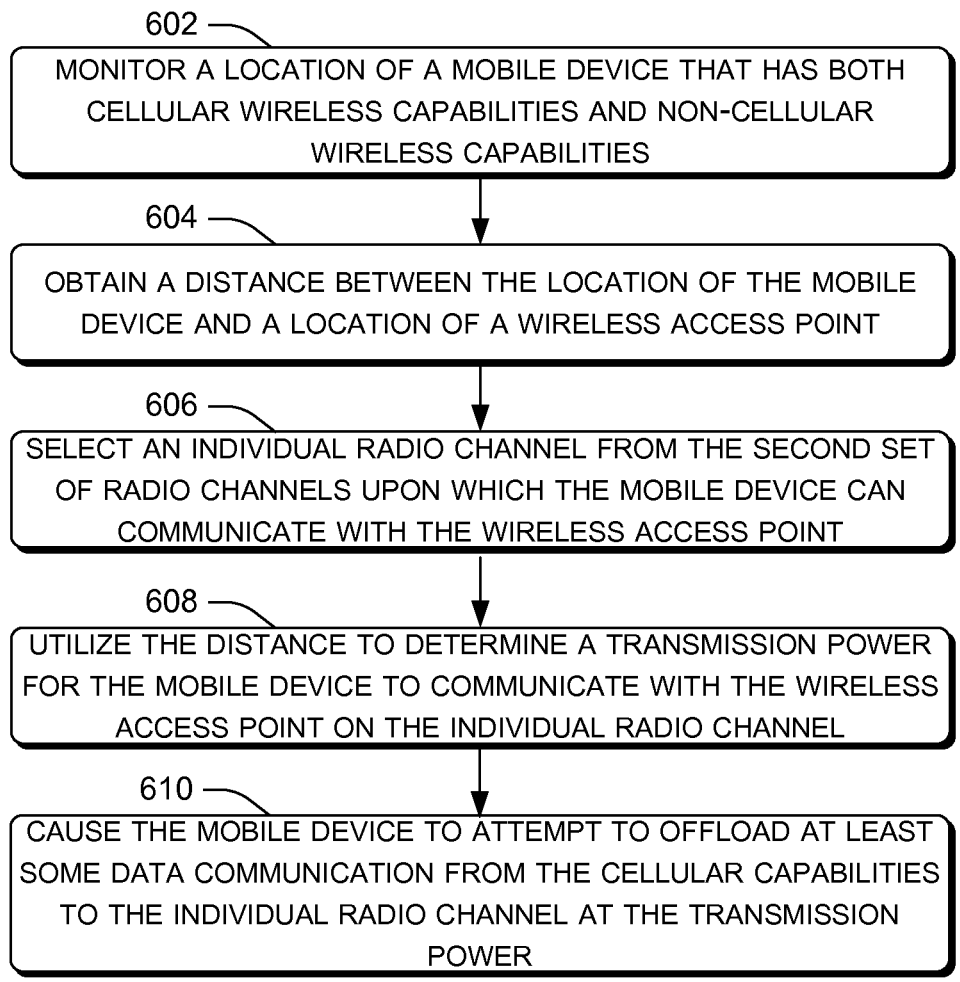

FIG. 6 shows a method 600 for radio channel communications.

The method can monitor a location of a mobile device that has both cellular wireless capabilities and non-cellular wireless capabilities at 602. The cellular wireless capabilities can utilize a first set of radio channels and the non-cellular wireless capabilities can utilize a second different set of radio channels. In some cases, the monitoring can be achieved by obtaining GPS coordinates from the mobile device. In other cases the monitoring can be accomplished by triangulating the location relative to other devices, such as cell towers, APs, etc.

The method can obtain a distance between the location of the mobile device and a location of a wireless access point at 604. In some cases, the distance can be obtained by calculating the distance from the location of the mobile device and the location of the AP. In other cases the distance can be obtained from a database. For instance, the database can relate the location of the mobile device to wireless access points, locations of the wireless access points, and networks supported by the wireless access points.

The method can select an individual radio channel from the second set of radio channels upon which the mobile device can communicate with the wireless access point at 606. In some cases, the selecting can be based upon identifying radio channels from the second different set of radio channels that the wireless access point has networks on. The radio channel can be selected from the radio channels based upon information regarding conditions on the networks.

The method can utilize the distance to determine a transmission power for the mobile device to communicate with the wireless access point on the individual radio channel at 608. Some device implementations may not have the ability to vary transmission power. As such, some method implementations can select and use a radio channel without performing block 608. In such a case, channel selection can be based upon suitability of the channel at the distance. For instance, the distance may be too great for use of a Bluetooth channel, but acceptable for use with a TV white space channel.

The method can cause the mobile device to attempt to offload at least some data communication from the cellular capabilities to the individual radio channel at the transmission power at 610. In some cases, the method can entail communicating the radio channel, the transmission power, and information about the wireless access point to the mobile device. In some examples, the communicating can be achieved on the cellular capabilities over a cellular control channel. In other cases, the method can be accomplished by the wireless access point communicating with the mobile device. A similar method can be employed to determine transmission power levels for APs or other devices. Of course, while specific devices may be called out in the method description above for purposes of explanation, the methods can be applied to any type of wireless device.

The order in which the example methods are described is not intended to be construed as a limitation, and any number of the described blocks or acts can be combined in any order to implement the methods, or alternate methods. Furthermore, the methods can be implemented in any suitable hardware, software, firmware, or combination thereof, such that a computing device can implement the method. In one case, the method is stored on one or more computer-readable storage media as a set of instructions such that execution by a processor of a computing device causes the computing device to perform the method.

Conclusion

Although techniques, methods, devices, systems, etc. pertaining to utilization of radio channels are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. One or more computer-readable storage media storing computer-readable instructions that when executed by a processor of a computer cause the computer to perform a method, comprising:

monitoring a location of a mobile device that has both cellular wireless capabilities and non-cellular wireless capabilities, the cellular wireless capabilities utilizing a first set of radio channels and the non-cellular wireless capabilities utilizing a second different set of radio channels;

obtaining a distance between the location of the mobile device and a location of a wireless access point;

selecting an individual radio channel from the second different set of radio channels upon which the mobile device can communicate with the wireless access point;

determining, based upon the distance, a transmission power for the mobile device to communicate with the wireless access point on the individual radio channel; and, causing the mobile device to attempt to offload at least some data communication from the cellular capabilities to the individual radio channel at the transmission power.

2. The one or more computer-readable storage media of claim 1, wherein the monitoring comprises obtaining GPS coordinates from the mobile device.

3. The one or more computer-readable storage media of claim 1, wherein the obtaining comprises comparing the location of the mobile device to a location-based dynamic database that associates wireless access points, locations of the wireless access points, and networks.

4. The one or more computer-readable storage media of claim 3, wherein the selecting comprises identifying, in the location-based dynamic database, radio channels from the second different set of radio channels that the wireless access point has networks on and selecting the individual radio channel from the radio channels of the second different set of radio channels based upon information in the location-based dynamic database regarding conditions on the networks.

5. The one or more computer-readable storage media of claim 1, wherein the causing comprises communicating the individual radio channel, the transmission power, and information about the wireless access point to the mobile device.

6. The one or more computer-readable storage media of claim 5, wherein the communicating is achieved on the cellular capabilities over a cellular control channel.

7. The one or more computer-readable storage media of claim 1, wherein the causing comprises causing the wireless access point to communicate with the mobile device.

8. The one or more computer-readable storage media of claim 7, wherein the causing the wireless access point to communicate with the mobile device comprises causing the wireless access point to send a probe response to the mobile device on the individual radio channel.

9. The one or more computer-readable storage media of claim 1, wherein the individual radio channel from the second different set of radio channels comprises multiple radio channels from the second different set of radio channels.

* * * * *